Feb. 15, 1927.
J. DE J. SANTOS
1,617,724
AUTOMOBILE DISPLAY DEVICE
Filed Sept. 2, 1925    2 Sheets-Sheet 1
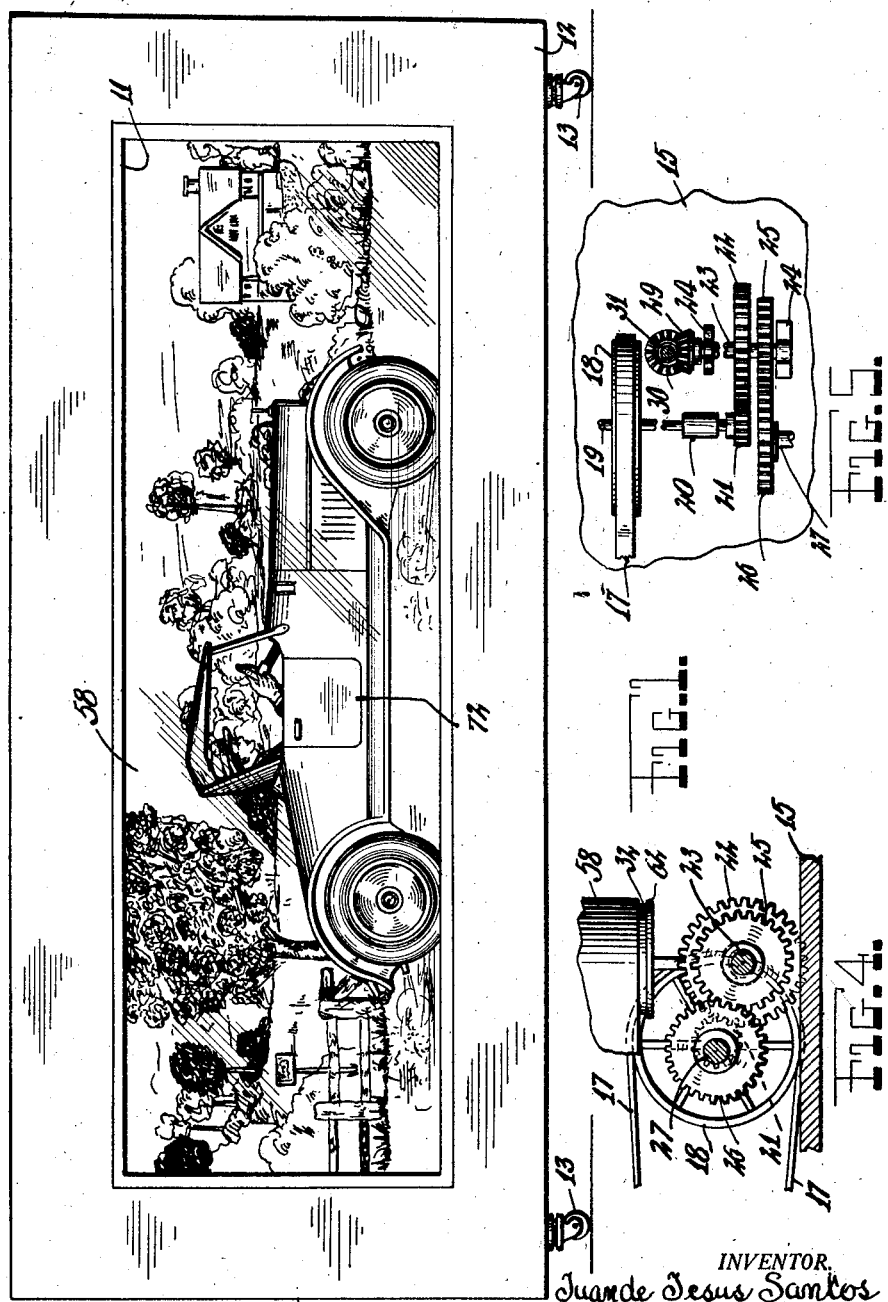
INVENTOR.
Juande Jesus Santos
BY
ATTORNEY Feb. 15, 1927.
J. DE J. SANTOS
1,617,724
AUTOMOBILE DISPLAY DEVICE
Filed Sept. 2, 1925    2 Sheets-Sheet 2
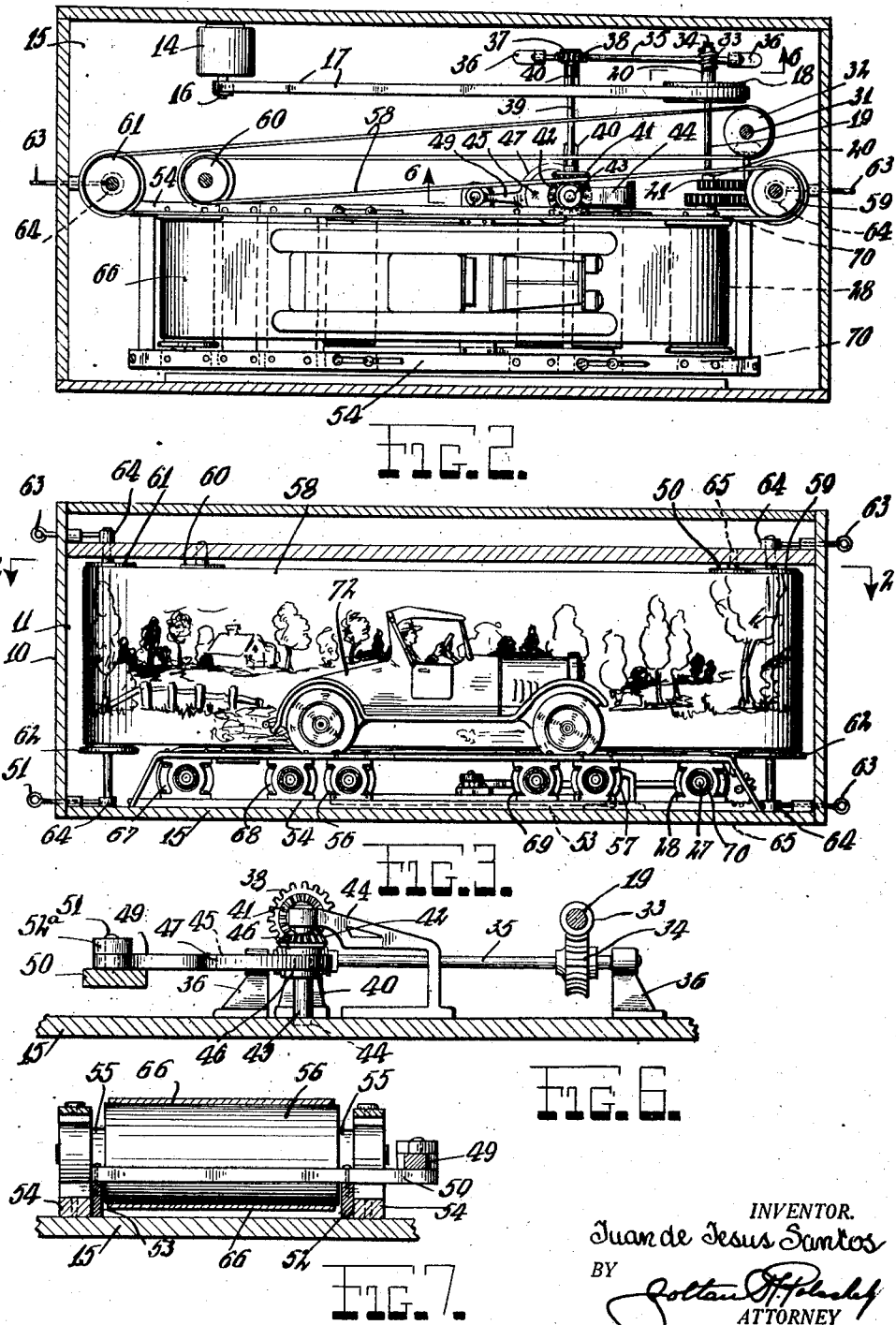
INVENTOR.
Juan de Jesus Santos
BY
ATTORNEY Patented Feb. 15, 1927.

1,617,724

UNITED STATES PATENT OFFICE.

JUAN DE JESÚS SANTOS, OF NEW YORK, N. Y.

AUTOMOBILE DISPLAY DEVICE.

Application filed September 2, 1925. Serial No. 53,983.

This invention relates generally to advertising devices used in store windows and the like, the invention having more particular reference to a novel type of advertising device. The invention has for an object the provision of an improved advertising device comprising movable scenery with a space provided in the foreground for a miniature or a full size automobile. A further object is to provide a means of rotating the wheels of the automobile. A still further object is to provide a means of causing the automobile to appear as though it were actually travelling over a road.
For further comprehension of the invention, and of the objects and advantages thereof, references will be had to the following description and accompanying drawings, and to the appended claims in which the various novel features of the invention are more particularly set forth.

Fig. 1 is a front elevational view of my improved advertising device as it would appear when ready to be operated and displayed.

Fig. 2 is a top plan view taken on the line 2—2 of Fig. 3.

Fig. 3 is a front elevational view showing the front cover removed so as to expose certain working parts.

Fig. 4 is a front elevational view of the mechanism for driving the device.

Fig. 5 is a top elevational view of the parts shown in Fig. 4.
Fig. 6 is a side elevational view taken on the line 6—6 of Fig. 2.

Fig. 7 is a side elevational view showing one of the movable rollers.

As here embodied my improved advertising device comprises a box 10 or housing having a suitable opening 11 in the front portion 12, the said box 10 being mounted on a plurality of casters 13 or similar means by which the said device may be easily moved from one place to another.

The electric motor 14, is rigidly attached to the base 15 of the said box 10, and conveniently located at or near the rear of the said base 15, the said electric motor 14 having a driving pulley 16 over which is extended the belt 17, the said belt 17 being also extended over the pulley 18 rotatively mounted on the shaft 19 and rigidly attached thereto, and having suitable and conveniently located bearings 20. The gear 21 is rigidly attached to the said shaft 19 at or near one extremity of the said shaft 19, the said gear 21 meshing with the gear 22 rigidly attached to the countershaft 23 rotatively mounted in suitable and conveniently located bearings 24, the said countershaft 23 having rigidly attached thereto a suitable and conveniently located gear 25 meshing with the gear 26 mounted on and rigidly attached to the roller shaft 27 to which is rigidly attached the roller 28. The said roller shaft having suitable and conveniently located bearings 70. The hereinbefore last mentioned four gears being employed to act as a speed reducing medium. The said countershaft 23 having rigidly attached at or near its other extremity a bevel gear 29 meshing with the bevel gear 30 rigidly attached to the shaft 31 to which is rigidly attached the scenery roller 32, the said shaft 31 having suitable and conveniently located bearings not shown in the accompanying drawing. The hereinbefore described construction being such as will permit the said electric motor 14 to revolve or rotate the said roller 28 and the said scenery roller 32.

The hereinbefore mentioned shaft 19 having attached at or near its other extremity a worm 33 meshing with the worm wheel 34 rigidly attached at or near the extremity of the shaft 35 and rotatively mounted in suitable and conveniently located bearings 36 and having rigidly attached at or near its other extremity the worm 37 meshing with the worm wheel 38 rigidly attached at or near one extremity of the shaft 39, the said shaft 39 being rotatively mounted in suitable and conveniently located bearings 40 and having rigidly attached at or near its other extremity a bevel gear 41 meshing with the bevel gear 42, the said bevel gear being rigidly attached to the shaft 43, rotatively mounted in suitable and conveniently located bearings 44, the said shaft 43 having rotatively mounted thereon an eccentric 45 or cam held in place by the collars 46, said collars being rigidly attached to the said shaft 43 surrounded with the eccentric strap 47 being a slidable rotary fit thereon, the said eccentric strap 47 having a protruding arm 49 or piece to which is attached the support 50 by means of a pin 51 and a collar 52ª, the said support 50 being rigidly attached to the slidable members 52 and 53, the said slidable members 52 and 53 being a slidable fit inside the frame 54, the said slidable members 52 and 53 having rotatively attached thereto by suitable and conveniently located bearings 55 the rollers 56 and 57. The hereinbefore described construction being such as will permit the said rollers 56 and 57 to be moved forward and backward by means of rotating the said eccentric 45.

A suitable fabric 58, upon which is painted or otherwise affixed attractive and suitable scenery as shown in the accompanying drawing, in the form of an endless belt passing around the said scenery rollers 32 and the scenery rollers 59, 60 and 61 having suitable flanges 62 located at or near the lower extremity of the said scenery rollers 32, 59, 61 and 62, to hold the said fabric 58 in place, the said scenery being moved past the said opening 11 by means of the said revolved scenery roller 32, the said scenery roller 32 being revolved as hereinbefore described. The said scenery rollers 59 and 61 being provided with protruding handles 63 or a similar device threaded in the said box 10 and attached at or near the upper and lower extremities of the said scenery rollers 59 and 61 by means of collars 64 so that the said scenery rollers may be drawn or pulled in opposite direction as a means of tightening the said fabric 58 in event said fabric 58 becomes loose. It being understood that the said scenery rollers 59 and 61 are rotatively mounted in the said collars 64 and that the said scenery roller 60 is rotatively mounted in suitable and conveniently located bearings 65 the said scenery rollers 32, 59, and 61 being mounted and having bearings as hereinbefore described.

The endless road belt 66 is extended over the said rollers 28, 56 and 57, and the rollers 67, 68 and 69; the said rollers 67, 68 and 69 having suitable and conveniently located bearings 71 mounted on the said frame 54, the said rollers 28, 56 and 57 having suitable and conveniently located bearings as hereinbefore described. The said endless road belt being driven by the hereinbefore mentioned driven roller 28.

In the operation of my improved advertising device, the miniature automobile, as represented by the numeral 72 in the accompanying drawings, is placed on the road belt so as to have its front wheels between the said rollers 57 and 69 and its rear wheels between the rollers 56 and 68, when the said electric motor is switched on, the said front and rear wheels of the said miniature automobile will be revolved by means of the construction as hereinbefore described for driving the said road belt. At the same time by the said forward and backward movement of the said rollers 56 and 57, the said miniature automobile will be caused to rise and fall as though it was actually traveling over a road. Furthermore, at the same time the said fabric upon which is painted attractive scenery will be moved past the said automobile, so as to make my improved advertising device appear even more realistic.

It will be understood that my improved device, may be driven by the wheels of the automobile and may be made of any suitable materials such as may be required for a device of this nature, and of suitable dimensions to accommodate miniature or full size automobiles of all styles and sizes.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the inventions as claimed.

Having thus described my invention, what I claim as new, and desire to protect by Letters Patent of the United States is as follows:—

1. The combination, in an advertising device having a miniature automobile provided with means for rotating the wheels thereof, and means for moving a fabric having a scenery painted thereon, of a pair of rollers, transversely mounted, straddling the front wheels of said miniature automobile, and another pair of rollers, straddling the rear wheels, said rollers being underneath said wheels, and means for reciprocating one of each pair of rollers forwards and backwards, to cause the automoible to rise and fall as though it was actually travelling over a road.

2. The combination, in an advertising device having a miniature automobile provided with means for rotating the wheels thereof, and means for moving a fabric having a scenery of a road, etc., painted thereon, of a pair of rollers, transversely mounted, straddling the front wheels of said miniature automobile, and another pair of rollers, straddling the rear wheels, said rollers being underneath said wheels, and means for reciprocating one of each pair of rollers forwards and backwards, characterized by a cam action, actuated from the wheel and fabric scenery driving means, to cause the automobile to rise and fall as though it was actually travelling over a road.

3. The combination, in an advertising device having a miniature automobile provided with means for rotating the wheels thereof, and means for moving a fabric having a scenery of a road, etc., painted thereon, of a pair of rollers, transversely mounted, straddling the front wheels of said miniature automobile, and another pair of rollers, straddling the rear wheels, said rollers being underneath said wheels, and means for reciprocating one of each pair of rollers forwards and backwards, characterized by a cam action, actuated from the wheel and fabric scenery driving means, and connected to slidable members carrying the bearings in which, said reciprocatable rollers are mounted, to cause the automobile to rise and fall as though it was actually travelling over a road.

In testimony whereof I have affixed my signature.

JUAN de JESÚS SANTOS.